United States Patent
Böttcher

(10) Patent No.: US 7,896,208 B2
(45) Date of Patent: Mar. 1, 2011

(54) APPARATUS AND A METHOD FOR CLEAVING THIN RODS

(75) Inventor: Uwe Böttcher, Stockholm (SE)

(73) Assignee: Nyfors Teknologi AB, Stockholm (SE)

( * ) Notice: Subject to any disclaimer, the term of this patent is extended or adjusted under 35 U.S.C. 154(b) by 0 days.

(21) Appl. No.: 12/321,697

(22) Filed: Jan. 22, 2009

(65) Prior Publication Data
US 2009/0224018 A1    Sep. 10, 2009

Related U.S. Application Data

(62) Division of application No. 10/519,284, filed on Dec. 27, 2004, now abandoned.

(51) Int. Cl.
*B26F 3/00* (2006.01)
(52) U.S. Cl. .......................... 225/1; 225/105
(58) Field of Classification Search .................. 83/956; 225/4, 105, 1
See application file for complete search history.

(56) References Cited

U.S. PATENT DOCUMENTS

| | | | | | |
|---|---|---|---|---|---|
| 4,039,309 | A | * | 8/1977 | Albanese et al. | 65/433 |
| 4,420,106 | A | * | 12/1983 | Hyatt | 225/2 |
| 4,484,412 | A | * | 11/1984 | Ishikawa | 451/28 |
| 4,790,465 | A | | 12/1988 | Fellows et al. | |
| 5,108,021 | A | * | 4/1992 | Vines | 225/2 |
| 5,195,410 | A | * | 3/1993 | Young | 83/13 |
| 5,768,970 | A | | 6/1998 | Wolf et al. | 83/701 |
| 5,842,622 | A | * | 12/1998 | Mansfield et al. | 225/96.5 |
| 6,000,310 | A | | 12/1999 | Shilkrut et al. | 83/615 |
| 6,196,095 | B1 | | 3/2001 | Suter | 83/13 |
| 2002/0145731 | A1 | * | 10/2002 | Kritler et al. | 356/73.1 |

FOREIGN PATENT DOCUMENTS

GB      2082565      3/1982

* cited by examiner

*Primary Examiner*—Kenneth E. Peterson
(74) *Attorney, Agent, or Firm*—Dilworth & Barrese, LLP.

(57) ABSTRACT

A method for cleaving thin rods of glass or quartz with a rod cleaving blade (27) and body (28) carrying the blade, is provided. The body (28) is of material varying in length through application of electric and/or magnetic fields. Driving force (31, 33) achieves relatively steady movement of the blade (27) towards a desired cleaving point and relatively steady small-amplitude vibratory component of movement towards and away from the cleaving point superimposed to the relatively steady movement, by influencing the body (28) electrically and/or magnetically. The blade is driven to vibrate with a frequency below 1 kHz during cleaving operation.

16 Claims, 4 Drawing Sheets

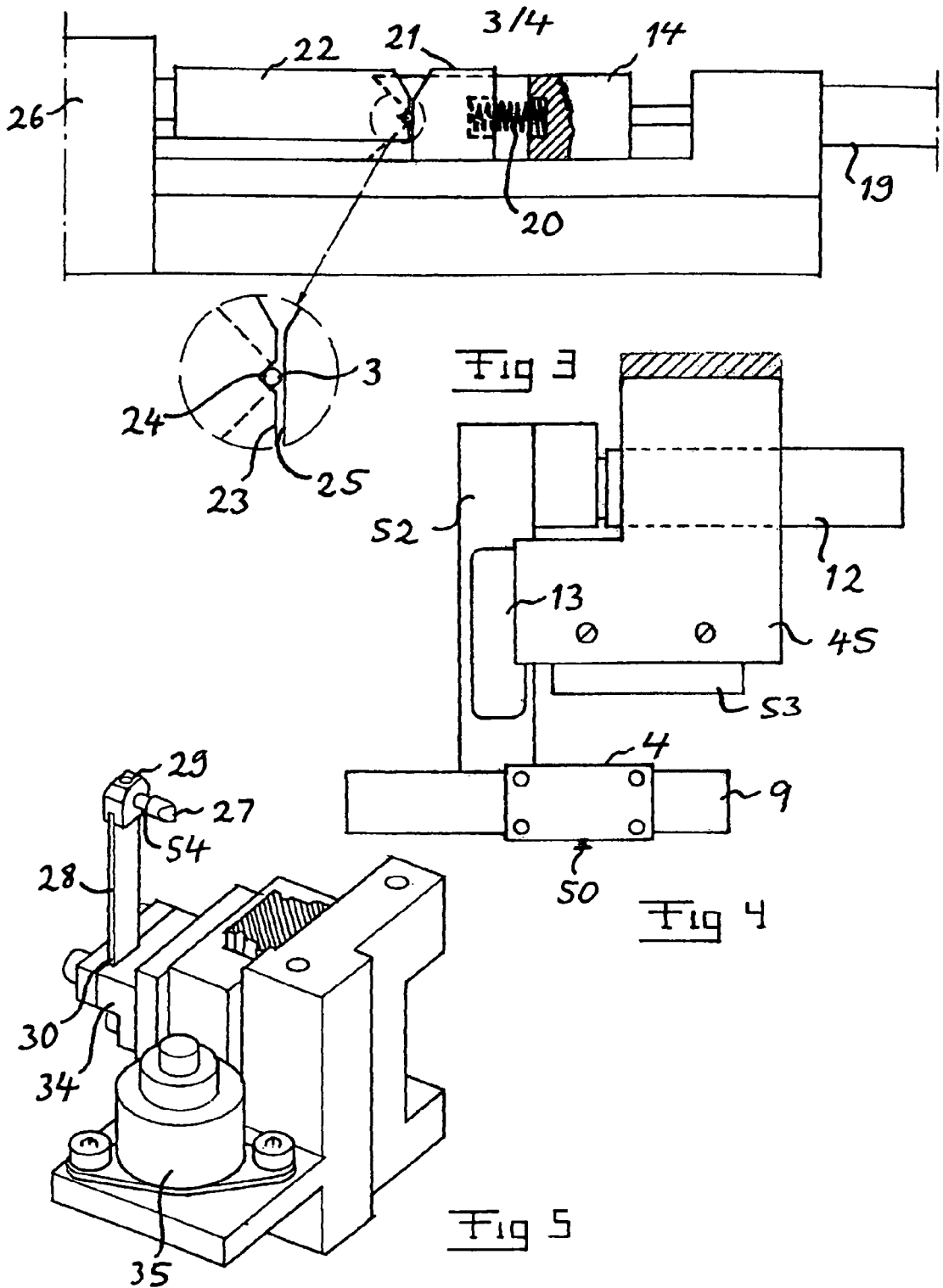

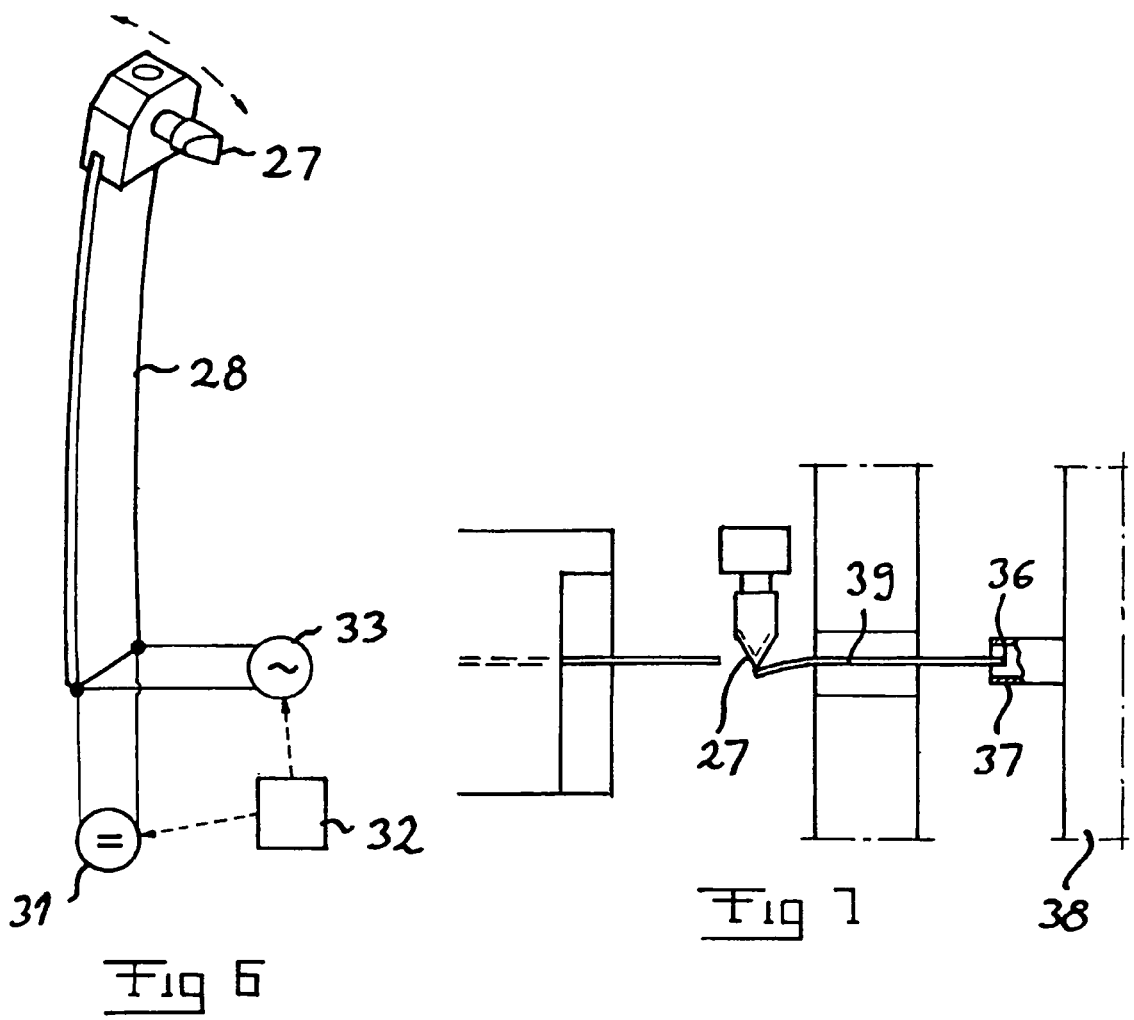
Fig 6
Fig 7
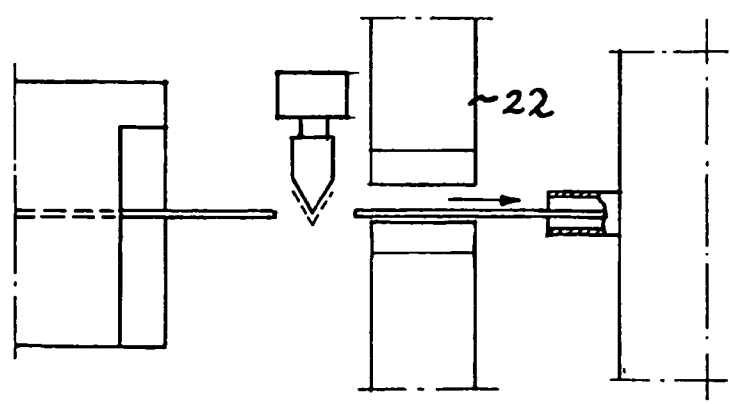
Fig 8

1

APPARATUS AND A METHOD FOR CLEAVING THIN RODS

CROSS-REFERENCE TO RELATED APPLICATION(S)

The present application is a divisional application of application Ser. No. 10/519,284 filed Dec. 27, 2004, now abandoned, the contents of which are incorporated by reference herein.

BACKGROUND OF THE INVENTION AND DESCRIPTION OF PRIOR ART

The present invention relates to an apparatus for cleaving thin rods of glass or quartz (silica) having a diameter below 1 mm as well as a method for carrying out such a cleaving.

Although the invention is in general directed to cleaving such thin rods of glass or quartz for any subsequent use, the invention is particularly directed to cleaving such thin rods of quartz in the form of optical fibres. The invention and the problem to be solved thereby will therefor hereinafter by way of example be discussed for cleaving such optical fibres without limiting the scope of the invention.

Optical fibre ends are commonly prepared for a variety of purposes (jointing, characterization etc) by a process known as cleaving. In such a process, a blade prepared from a hard material, such a diamond, is brought into a lateral engagement with the fibre to be cleaved in such a manner as to initiate a fracture which subsequently propagates through the fibre cross-section until the fibre parts. The resulting cleaved fibre end surface should, as far as possible, be optically flat and perpendicular to the fibre longitudinal axis. Undue intrusion of the blade into the fibre during the cleaving process can damage the fibre so as to detract from the quality of the resulting end surfaces.

An apparatus is already known through U.S. Pat. No. 4,790,465. By using such a driving means for superimposing a relatively small-amplitude vibratory component of movement towards and away from the cleaving point to a relatively steady movement towards the cleaving point it has turned out that an anvil for supporting the optical fibre at the cleaving point is superfluous. This means that it will be easier to accurately monitor the cleaving process for improving the result thereof. However, it is emphasized that the present invention is not restricted to an apparatus having no such anvil, but also apparatuses with a supporting anvil are conceivable.

The apparatus according to said US-patent needs frequencies above 1 kHz for said vibratory component of movement, and in fact frequencies above 20 kHz are used there. Although the apparatus of U.S. Pat. No. 4,790,465 may be used for obtaining comparatively high quality cleaved fibre end surfaces there is of course always a desire to improve such an apparatus with respect to both the cleaving result and the construction and by that the costs for manufacture and operation thereof.

SUMMARY OF THE INVENTION

The object of the present invention is to provide an apparatus of the type defined in the introduction being improved in at least some aspect with respect to such apparatuses already known.

This object is according to the invention obtained by providing such an apparatus having the characteristics that the body carrying the blade is of a material varying its length through application of electric and/or magnetic fields therein, that said driving means is adapted to achieve said movements of the blade by influencing said body electrically and/or magnetically for creating length variations of the material thereof, and that the driving means is adapted to make the body and by that the blade vibrate with a said relatively small-amplitude component having a frequency below 1 kHz towards and away from the cleaving point for cleaving a said rod.

It has turned out that the use of a body of such a material and an electrical and/or magnetical influence thereupon for creating both superimposed movements of the blade in combination with a frequency of the vibratory component below 1 kHz results in excellent cleaving properties. Experiments has shown that the optical flatness of cleaved fibre end surfaces resulting from the use of such an apparatus are improved with respect to the apparatus according to the US-patent discussed above. An advantage of using such low frequencies is that the blade will by this move comparatively far in the direction towards the fibre in the period of time between two subsequent oscillations at a given, suitable velocity of said relatively steady movement. This means that the probability that the fibre parts after being cut once by the blade is high, and the fibre end surface resulting from the cleaving would be degraded by additional cuts by the blade. Another advantage of the use of such comparatively low frequencies is that it is easier to create such frequencies and frequencies within this range results in less problems with harmonics.

It is true that the possibility to use one and the same body for creating both superimposed movements is mentioned in said US-patent, but no functioning embodiment has been proposed there, which probably is due to the fact that it was not understood that the frequency has to be lowered substantially with respect to the frequencies used in the apparatuses of said US-patent for making such an embodiment functioning, which was in contradiction to the embodiments described there only functioning for frequencies far above 1 kHz.

According to a preferred embodiment of the present invention said driving means is adapted to make the blade vibrate with a frequency below 750 Hz, between 100 and 700 Hz or between 250 and 450 Hz. It has been found that frequencies coming close to 1 000 Hz give rise to resonance effects in said body of said material, and it is necessary to keep the frequency well below such a resonance frequency. This means for some designs of said body that the frequency should be kept below 750 Hz and it is preferred that the frequency is well below the resonance frequency and for some embodiments below 450 Hz. Although the US-patent mentioned above indicates that it shouldn't be possible to cleave rods of this type while using frequencies below 1 kHz, it has surprisingly been found that much lower frequencies may be used with a maintained and even improved cleaving result.

According to other preferred embodiments of the invention the apparatus is adapted to cleave optical fibres and to cleave rods having a diameter below 600 µm or below 300 µm and preferably between 50 and 200 µm, which are typical dimensions of the cross section of an optical fibre including the core and the cladding.

According to other preferred embodiments of the invention the piezo-electrical effect or the magneto-strictive effect are used for obtaining the two superimposed movements of the blade.

According to a very preferred embodiment of the invention the blade is arranged on a free end of a said body in the form of a strip-like stave being fixed at the other end, and said driving means is adapted to cause said movements through bending the strip-like stave towards said desired cleaving point of the rod so that said movements of the blade take place along an arc-like path and the blade will hit the fibre in a direction making an angle with the fibre differing from 90° for cutting the fibre in this direction. It has turned out that the movements of the free end of such a strip-like stave and by that of the blade may be controlled very accurately for obtaining a cleaving result with excellent properties when using the piezo-electric or magneto-strictive effect in combination with the low frequencies mentioned above. By this path of said movements the blade will also "scratch" the fibre when hitting it resulting in a cleaner score and fibre end surface than when just impacting the fibre perpendicularly thereto as in said U.S. Pat. No. 4,790,465. This action is further improved by arranging the blade on the free end of a projection projecting from the stave towards the fibre at a distance from the stave.

According to another preferred embodiment of the invention said arrangement comprises a first clamping means arranged to clamp said rod in a first said clamping location, said first clamping means has a first clamping member with a clamp face of substantially V-groove type, for receiving the rod in the groove, and a second clamping member having a flat opposing clamp face for retaining the rod in the groove, and the first clamping member having the groove clamped face is moveable towards and away from the second clamping member for clamping and releasing a said rod. By arranging the grooved clamp face on the moveable clamping member it will be easier to exchange this clamping member for example when the groove has been worn out, with respect to the construction according to said US-patent, in which the groove is arranged in the fixed clamping member. This means shorter periods of drop out of the apparatus and lower risks of a degraded accuracy resulting from said exchange.

According to another preferred embodiment of the invention constituting a further development of the embodiment last mentioned the first clamping member is received in a guide and removable from the apparatus by pushing or lifting it out of the guide for exchange. Such an arrangement of the first clamping member having the grooved clamp face means that this clamping member may be removed and exchanged very easily and rapidly and without any problem to maintain a high accuracy of the clamping action.

According to another preferred embodiment of the invention said arrangement comprises a second clamping means arranged to clamp said rod in a second said clamping location, the second clamping means is movable in the longitudinal direction of a said rod extended between the two clamping locations, the apparatus comprises means for moving the second clamping means in said longitudinal direction for extending a rod clamped by said arrangement for applying a longitudinal tension load to the rod, and the second clamping means is adapted to clamp said rod in a second said clamping location belonging to the part of a cleaved rod intended for later use. This means that there is a possibility to use the power applying the tension load to move the cleaved end surface away from the cleaving point immediately when the rod parts, so that there will be no risk of damaging this end surface by further contact with the blade after the cleaving instant. This is also the subject of another preferred embodiment of the invention. Such an embodiment is particularly advantageous in the case of having an apparatus with a body carrying the blade and driving means adapted to act upon said body for causing a relatively steady movement of the blade towards said desired cleaving point while subjecting the blade to a relatively small-amplitude vibratory component of movement towards and away from said cleaving point superimposed to said relatively steady movement towards the cleaving point, since this then means that there will be no risk that the vibrating blade will hit the rod once again after the rod has been cleaved.

According to another preferred embodiment of the invention the apparatus further comprises at least one member having at least one inclined surface and means for moving said member laterally towards a rod being clamped in only one of said two clamping locations before clamping it in the other clamping location with the inclined surface into abutment against the rod for influencing the rod by sliding thereof upon said surface for reaching the position desired for said other clamping location before clamping the rod in that location. The existence of such a member moving the rod into the desired position before the rod is clamped in said other clamping location means that the clamping action may be carried out while reducing the risk of twisting the rod by said clamping action, which would degrade the quality of the future cleaved end surface.

The invention also relates to a method of cleaving a thin rod according to the appended independent method claim. The advantages of such a method and the embodiments thereof according to the appended dependent method claims appear without any doubt from the above discussion of the preferred embodiments of the apparatus according to the present invention.

The invention also relates to a computer program and a computer readable medium according to the corresponding appended claims. It is easily understood that the method according to the invention defined in the appended set of method claims is well suited to be carried out through instructions from a processor that may be influenced by a computer program provided with the program steps in question.

Further advantages as well as advantageous features of the invention appear from the following description and the other dependent claims.

BRIEF DESCRIPTION OF THE DRAWINGS

With reference to the appended drawings, below follows a specific description of a preferred embodiment of the invention cited as an example.

In the drawings:

FIG. 3 is a simplified side-elevation of a part of the apparatus according to FIG. 1 illustrating the means for clamping the rod in one of said clamping locations and adjusting the height of the rod to be clamped there more in detail, FIG. 4 is a simplified view illustrating how the means for clamping said rod in the other clamping location may be moved for moving said clamping location in the longitudinal direction of the rod, FIG. 5 is a simplified perspective view illustrating the body carrying the rod cleaving blade and the driving means used to perform the cleaving operation, FIG. 6 is a simplified perspective view of said rod cleaving blade and the body carrying the blade illustrating the principal of achieving the cleaving movements of the blade, FIG. 7 is a simplified view from above of a part of the apparatus according to FIG. 1 in a state of the cleaving sequence in which the vary cleaving has already been carried out, and FIG. 8 is a view corresponding to FIG. 8 of the step of said cleaving sequence following directly upon the state illustrated in FIG. 7.

DETAILED DESCRIPTION OF A PREFERRED EMBODIMENT OF THE INVENTION

Figure 1:
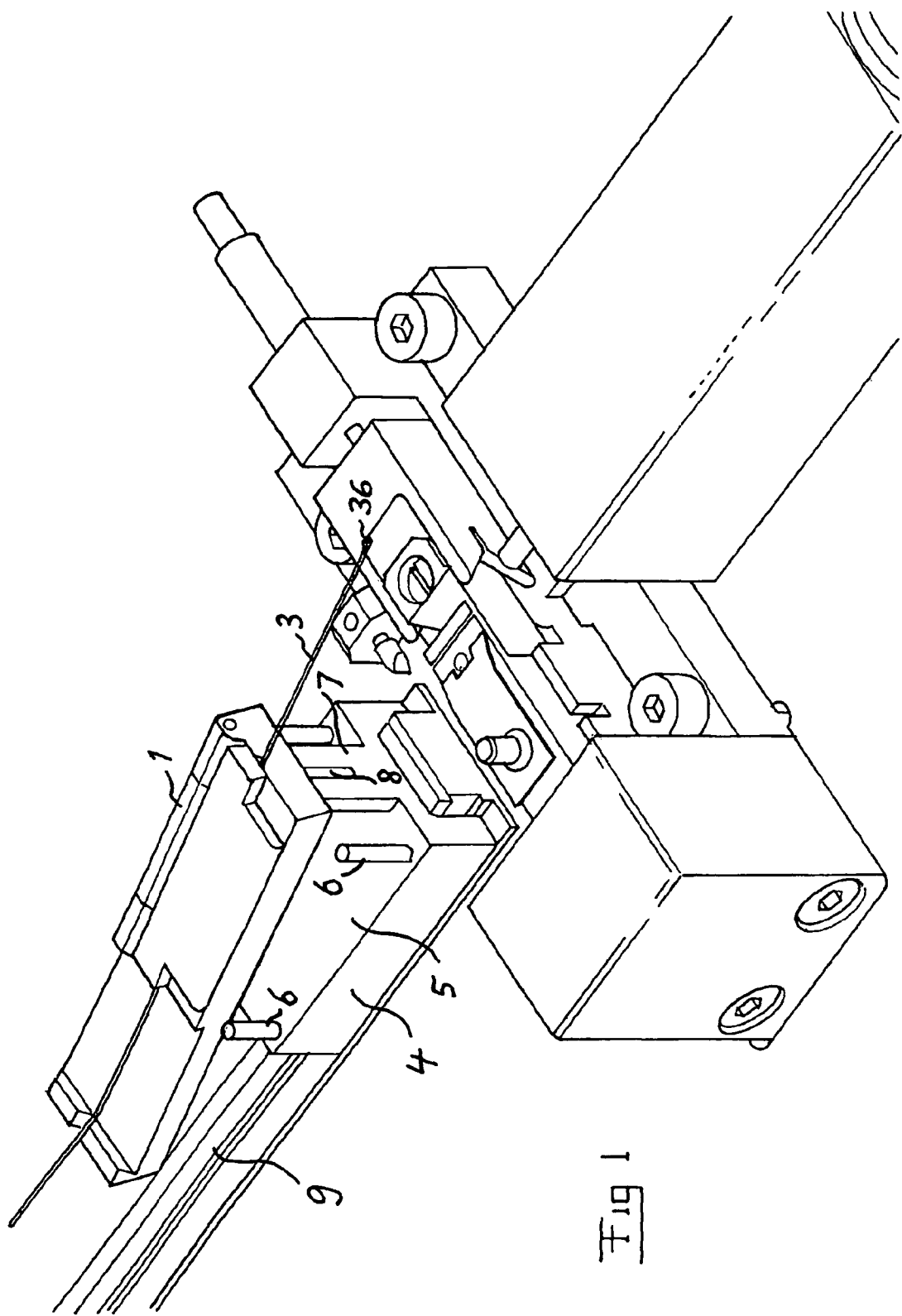
FIG. 1 is a perspective view of an apparatus according to a preferred embodiment of the invention in an initial state of a cleaving sequence of loading the apparatus with a thin rod, such as an optical fibre, to be cleaved.
Figure 2:
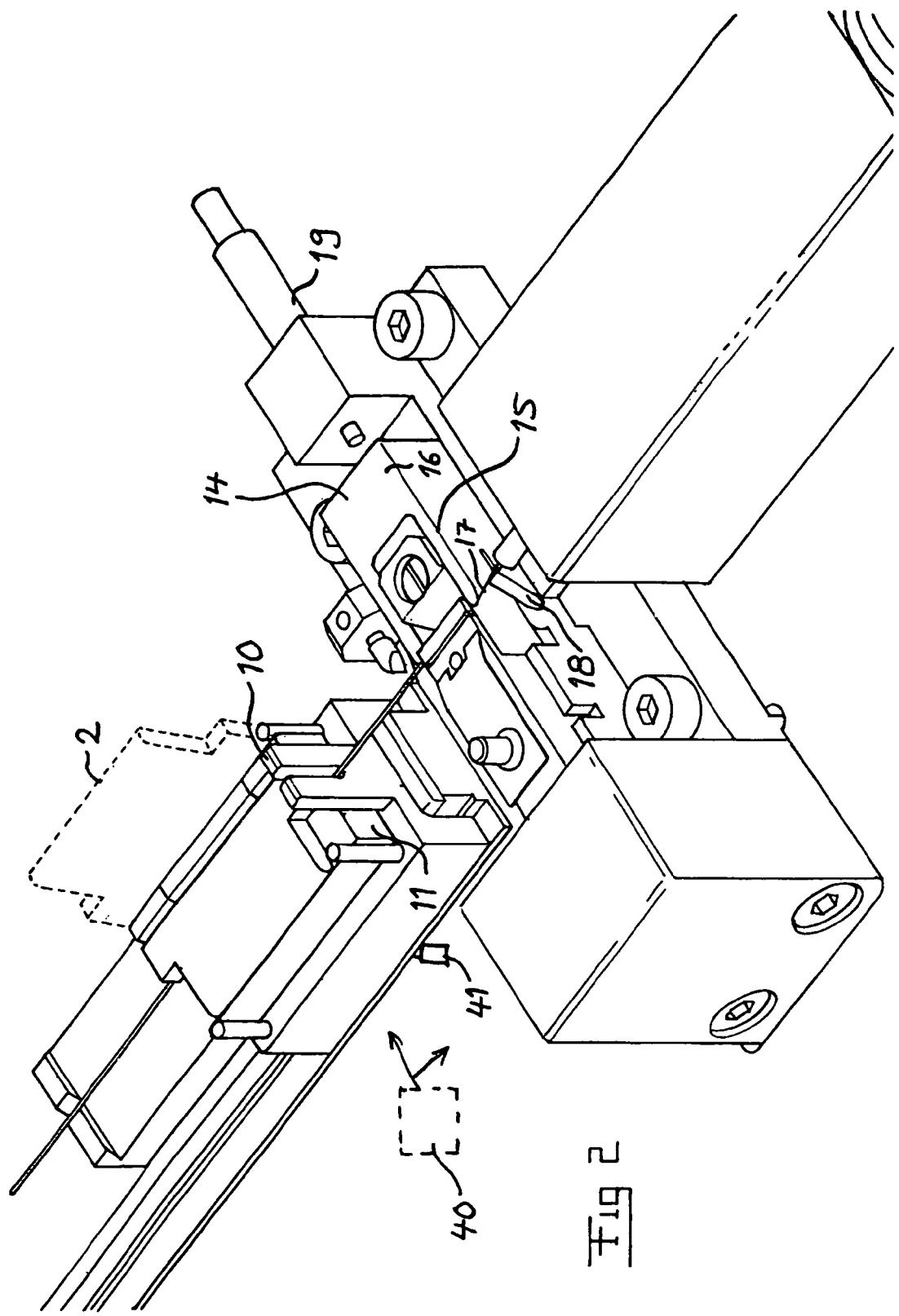
FIG. 2 is a view corresponding to FIG. 1 of the apparatus in a state of said cleaving sequence in which the thin rod has been clamped in two mutually-spaced clamping locations.

FIG. 1 illustrates an apparatus for cleaving thin rods of glass or quartz, preferably optical fibres, having a diameter below 1 mm, and preferably in the range of 50 μm-200 μm. The optical fibre is clamped in a second clamping means 1 in the form of a conventional fibre holder used for holding a fibre also when joining two optical fibres, and this is already known. It is schematically illustrated in FIG. 2 by dashed lines how a lid 2 of said clamping means may be pivoted for opening and closing this clamping means. This clamping means 1 is adapted to hold the fibre to be cleaved with a part 3 on which the cleaving is to be carried out projecting out from the fibre holder.

The apparatus also comprises a member 4 adapted to receive the fibre holder 1 therein for holding it in a well-defined position during the cleaving sequence. The receiving member 4 has the character of a carriage with a bottom 5 onto which the fibre holder is intended to rest and guiding members 6 in the form of pins for laterally supporting the fibre holder in a well defined position on the carriage 4. The carriage has also a front member 7 extending upwardly from the bottom 5 and defining the position of the fibre holder in the longitudinal direction of a fibre held therein. This front member 7 has a central slot 8 extending therethrough and opening upwardly for receiving the free fibre part 3 therein. The carriage 4 is moveable in the longitudinal direction of a fibre in a fibre holder received therein and in the longitudinal direction of a rail 9 in a way to be described further below.

This construction of said receiving member 4 is very favourable with respect to the loading of a fibre to be cleaved in the apparatus. This loading action takes place in the following way. The fibre holder 1 with a fibre clamped therein and a part 3 to be cleaved projecting out therefrom is placed in the position shown in FIG. 1 with the front portions of the fibre holder 1 resting upon the upper surfaces 10 of the front member 7. The guiding pins 6 will define the correct direction of the fibre holder. The fibre holder 1 is then retracted, so that it will leave the support on the front member 7 and be lowered onto the bottom 5 of the receiving member 4 while being guided in a well defined movement through the guiding pins 6, and the part 3 of the fibre will move down in the slot 8 to the position shown in FIG. 2. This well controlled movement of the fibre part 3 means that there is no risk of damaging the fibre through contact with other members of the apparatus during this loading action.

Furthermore, the front member 7 and the bottom 5 of the carriage 4 are adapted to magnetically interact with the fibre holder 1 having for this sake magnets for keeping the fibre holder in a well defined position with the front end 11 thereof into contact with the front member 7.

It is illustrated in FIG. 4 how the carriage is fixed to the rail 9 with a screw 50. This is done for obtaining the correct cleaving length. Means 12 for moving the rail 9 and by that the carriage 4 in the form of a dc-motor is arranged to act between a fixed frame 45 of the apparatus and an arm 52 rigidly connected to the rail 9 for moving these parts in a linear bearing 53. The connection between the motor 12 and the carriage 4 includes means 13 in the form of a load cell for measuring the load applied through the motor onto the carriage. This means when the clamping part 3 is clamped in another clamping location downstream of the fibre holder 1 that the tension in said fibre may be influenced by the motor 12 and the magnitude of that tension load may be measured by the load cell 13. The apparatus also comprises means 41 for very accurately measuring the position of the carriage 4 and communicating with a computer 40 (see below).

The apparatus also comprises a member 14 adapted to adjust the position of the fibre part 3 in another of said two clamping locations thereof before the fibre is clamped in that location. This member 14 comprises for that sake two members 15 extending substantially in parallel with each other from a frame 16 and having each two inclined surfaces 17, 18, which are oppositely inclined with respect to a horizontal plane through the two clamping locations desired. Driving means 19, here driven by compressed air, is arranged to move the member 14 so that the fibre part 3 comes into abutment against one of the inclined surfaces of each member 15 for sliding thereupon and reaching the position desired for a clamping location of the fibre part 3 corresponding to a position of the fibre part in a seat of the members 15 in the intersection between the two inclined surfaces 17, 18 of each member 15. This means that the fibre part 3 is then in a well-defined position before it is clamped, so that it may be subsequently clamped without being damaged or exerted to torsion loads or the like.

It is further illustrated in FIG. 3 how a spring member 20 is counter-acting the driving means 19 while being arranged to act between a member 21 being fixed with respect to a frame work of the apparatus and the frame 16 of the member 14, so that the member 14 will automatically be withdrawn from the fibre part when the influence of the driving means 19 thereupon is removed.

The apparatus also comprises a first clamping means adapted to clamp the fibre in one of said two mutually-spaced clamping locations, and this first clamping means comprises a first clamping member 22 with a clamp face 23 of substantially V-groove type, for receiving a fibre part 3 in a groove 24, and a second clamping member formed by said fixed member 21 having a flat opposing clamp face 25 for retaining the fibre in the groove. The apparatus comprises a driving means 26 driven by compressed air for moving said first clamping member 22 in the direction towards the second clamping member 21 for clamping a fibre. The first clamping member 22 is constituted by a block-like piece resting only by means of the gravitation on a surface in a guide, so that it may easily be removed from the apparatus by lifting it out of the guide for exchange when the groove or the face portions adjacent thereto have been worn out or for replacing it by a first clamping member being designed for clamping rods with a different diameter.

The apparatus also comprises a rod cleaving blade 27 (see especially FIGS. 5 and 6) adapted to be brought into lateral contact with the fibre at the desired cleaving point between said two clamping locations, to achieve cleaving of the fibre at said point. This blade 27 is made of a hard material, such as diamond. The cleaving blade is carried by a body 28 comprising a strip-like stave having the blade 27 arranged on a free end 29 thereof and being fixed at the other end 30. This stave is made of a material varying its length through application of an electric field therein, i.e. a piezo-electric material.

The apparatus further comprises driving means adapted to act upon the stave for causing a relatively steady movement of the blade towards a desired cleaving point while subjecting the blade to a relatively small-amplitude vibratory component of movement towards and away from said cleaving point superimposed to said relatively steady movement towards the cleaving point. The arrangement of the blade on a free end of a stave means that said movements of the blade, both the relatively steady movement and the relatively small-amplitude vibratory component of movement, take place along an arc-like path and the blade will hit the fibre in a direction making an angle with the fibre differing from 90° for cutting the fibre in this direction. Accordingly, this path of these movements means that the blade will "scratch" the fibre when hitting it resulting in a cleaner score and fibre end surface than when just impacting the fibre perpendicularly thereto as in said U.S. Pat. No. 4,790,465. This scratching action is further improved by arranging the blade on the free end of a projection 54 projecting from the stave towards the fibre at a distance from the stave. The movements are achieved in the way illustrated in FIG. 6 by applying a direct voltage through a direct voltage source 31 across the stave 28, the magnitude of which is controlled by a control means 32 for bending the free end of the stave 28 towards a fibre clamped in the apparatus. The driving means also comprises an alternating voltage source 33 adapted to apply an alternating voltage across the stave 28 for generating said vibratory component of movement of the blade. Also the alternating voltage source is controlled by the control means 32. The alternating voltage applied to the stave has a frequency below 1 kHz and preferably below 750 Hz. In a particular embodiment the frequency is about 350 Hz. The peak to peak voltage of the alternating voltage may typically be in the order of 50 V, whereas the direct voltage may typically be varied from 0 to 100 V.

The stave 28 is fixed to a frame 34 moveable with respect to the framework of the apparatus through a step motor 35 in the vertical direction in steps of for example 50 μm for controlling the position along the blade of the blade portion used for cleaving a fibre, so that this position may be changed for changing said blade portion when a previous blade portion has been worn out, for example after carrying out about 1 000 cleaving operations while using the same blade portion therefor. This is preferably controlled by a computer program.

The rest of the constructional features of the apparatus according to the invention will now be explained while explaining the entire cleaving sequence of the apparatus:

The fibre holder 1 is firstly arranged in the carriage 4 in the way indicated in FIG. 1 and in the position shown in FIG. 2. A button is then pressed and the rest of the operation of the apparatus will take place automatically and preferably controlled by a computer 40 indicated in FIG. 2. The dc-motor 12 will firstly move the carriage 4 so that the free end 36 of the fibre comes inside a small tube 37 belonging to a device 38 adapted to draw a waist fibre portion 39 away through application of negative air pressure after the cleaving has been performed. After that the driving means 19 moves the members 15 towards the fibre for entering contact therewith through the inclined surfaces 17, 18 for adjusting the height of the fibre.

The driving means 26 is then pushing the first clamping member 22 of the first clamping means towards the fixed clamping member 21 for clamping the fibre in a first clamping location mutually-spaced from the second clamping location defined by the fibre holder 1. The action of the driving means 19 upon the member 14 is then removed, so that this member 14 is retracted through the action of the spring member 20. Said computer indicated through the dashed box 40 is then sending a signal to the means 12 for influencing the carriage 4 in the longitudinal direction of the fibre away from the second clamping location for applying a tension load to the fibre. The magnitude of this tension load is measured through the load cell 13 sending information thereabout to the computer 40. The tension load is in this way set to a value by the computer, for instance 1.5 N, but this value will change with the diameter of the fibre or the rod to be cleaved.

The driving means 35 is then controlled to move the blade 27 vertically to the desired position for the cleaving procedure. The control unit 32 does then control the direct voltage source 31 to gradually increase the direct voltage applied to the stave 28 for bending the stave, so that the blade 27 carries out a relatively steady movement towards the fibre. The control unit 32 controls at the same time the alternating voltage source 33 to apply an alternating voltage to the stave 28 for causing the blade 27 to vibrate towards and away from the fibre with a small amplitude in the order of 5-40 μm, preferably in the range of 30 μm. The blade 27 will in this way move with a velocity in the order of 1 mm/s towards the fibre while oscillating for cleaving the fibre. The low frequency of the vibration means that the blade 27 will move comparatively far in the direction towards the fibre in the period of time between two subsequent oscillations at a given suitable velocity of said relatively steady movement. When for example this velocity is 1 mm/s and said frequency is 400 Hz this means an advancing distance of 2.5 μm between subsequent "strikes" or "cuts" of the blade, which is much more than for the blade in the US-patent discussed in the introduction. This is a great advantage, since it means that the probability that the fibre parts already after being hit once by the blade is high and the fibre end surface resulting from the cleaving would be degraded by additional hits by the blade. This low frequency effect is particularly advantageous in combination with the type of movement path described by the blade in the embodiment of the invention illustrated in the figures. When for example the entire stroke (the length of said path for the relatively steady movement) of the blade is 500 μm the height position of the blade will be lowered by about 250 μm. this means that the blade in average sinks 0.5 μm for each 1 μm of advance. The intrusion of the blade into the fibre may be about 2 μm. If the fibre is displaced 3 μm before the blade penetrates into the fibre the blade is in contact with the fibre over a distance of 5 μm while moving downwardly by 2.5 μm in a cutting, scratching movement. In fact, the blade will move even longer, >3 μm, downwardly when scratching the fibre as a consequence of an increase of this component of the movement direction the closer the blade comes the fibre. The load cell 13 will indicate that the fibre has been cleaved through the disappearing of the tension load in the fibre. This information from the load cell will cause the control means 32 to stop the oscillation of the blade and remove the bending action thereupon. Furthermore, the spring force in the load cell will automatically move the cleaved fibre end away from the blade immediately when the fibre parts.

The motor 12 is then controlled to move the carriage 4 slightly, in the order of 1 mm, away from the cleaving point for removing the cleaved end surface from the cleaving point as shown in FIG. 7. The driving means 19 is then controlled to move the member 14 to the position shown in FIG. 7 in contact with the waist fibre portion 39 resulting from the cleaving. The control means 32 influences then the direct voltage source 31 to move the blade 27 towards the waist fibre portion to laterally apply a force thereonto as shown in FIG. 7. The driving means 26 is then controlled to move the first clamping member 22 of the first clamping means away from the second clamping member 21 for releasing the waist fibre portion, and the tension caused therein by the blade will assist the waist fibre portion to leave the groove 24 and be drawn away through the tube 37 by the device 38 for being disposed of.

The member 14 is retracted by shutting-off the pressurized air to the means 19, so that the spring 20 pushes the member 14 back. After that the control means 32 controls a withdrawal of the blade and the motor 35 returns the blade to the start position. The fibre holder 1 may now be removed for using the fibre end surface obtained through the cleaving process for joining or other purposes. The carriage 4 is moved to the "home" position by means of the dc-motor 12. The apparatus is now ready for cleaving a new fibre.

Studying the fibre end surfaces obtained by carrying out said cleaving process in the apparatus according to the present invention in interference microscope has shown that these end surfaces are of a very high quality, i.e. they are all within ±0.17° from being exactly perpendicular to the fibre longitudinal axis.

The invention is of course not in any way restricted to the preferred embodiment described above, but many possibilities to modifications thereof will be apparent to a person with ordinary skill in the art without departing from the basic idea of the invention as defined in the appended claims.

Although not necessary, it is well possible to use an anvil to support the fibre at the cleaving point.

The material of the body carrying the blade may just as well be of the type varying its length through application of magnetic fields, i.e. which has magneto-strictive properties, so that a relatively steady varying magnetic field and an alternating magnetic field may be used for generating the two superimposed movements of the blade according to the present invention.

"Relatively steady" as used for one of the movements of the blade is to be interpreted in relation to the vibratory component of movement, and does not restrict this movement to have a constant speed, but this may be changed during the movement, for example gradually decreasing or even gradually increasing. "Relatively small-amplitude" with respect to the vibratory component of movement is to be interpreted as indicating that the amplitude of this movement is small with respect to the distance the blade is moving through said relatively steady movement thereof.

It is possible to replace the members having two inclined surfaces by members having each only one inclined surface and being moved from two opposite directions towards said rod.

Although it is spoken about fibre "height" adjustment and other words defining the orientation of the apparatus are used, these are to be interpreted as not restricting the scope of the present invention, but it would for example be possible to arrange the apparatus with the fibre clamped therein extending vertically.

The guiding pins for laterally supporting the fibre holder may be replaced by any suitable guiding members, such as lateral guiding walls.

The preferred movements along an arc-like path could of course be achieved in other ways than by a stave as explained above, such as through suitable guiding means, although the stave embodiment is very advantageous.

The member having at least one inclined surface for guiding the rod into said groove may just as well be arranged on the first clamping member laterally thereof for being moved together therewith so that the same driving means may be used for these two members.

The invention claimed is:

1. A method of cleaving a thin rod of glass or quartz having a diameter below 1 mm, comprising the steps of:
   supporting said rod (3) in a working position;
   bringing about a relatively steady movement of a cleaving blade (27) towards a point of lateral contact with said rod; and
   superimposing on said relatively steady movement of the blade a relatively small-amplitude vibratory component of movement, said vibratory component being towards and away from the axis of the rod, wherein said vibratory component of movement having a frequency below 1 kHz is applied to the blade; and,
   further comprising the step of clamping, prior to the supporting step, in which said rod (3) is clamped in two mutually-spaced clamping locations for holding the rod (3) extended between these two clamping locations in said working position, and in which the clamping in a first clamping location is carried out by translationally moving a first clamping member (22) with a clamp face (23) of substantially V-groove type (24), for receiving the rod (3) in the groove (24), towards a second clamping member (21) having a flat opposing clamp face (25) for retaining the rod (3) in the groove (24) for clamping the rod (3).

2. A method according to claim 1, wherein it further comprises a step of adjusting the position of a rod (3) being clamped in only one of said two clamping locations before clamping it according to said clamping step in the other clamping location, in which at least one member (14) having at least one inclined surface (17, 18) is moved laterally towards said rod with the inclined surface into abutment against the rod for influencing the rod by sliding thereof upon said surface for reaching a position desired for said other clamping location.

3. A method according to claim 2, wherein in said adjusting step one or more said members (14) having together at least two said inclined surfaces (17, 18), which are oppositely inclined with respect to a plane including said two clamping locations, are moved laterally towards said rod (3) for moving the rod to a seat in an intersection between said two inclined surfaces as seen in the direction from one clamping location to the other.

4. A method according to claim 1, wherein it further comprises a step, carried out prior to said supporting step, of clamping said rod (3) in two mutually-spaced clamping locations for holding the rod extended between these two clamping locations, after this clamping step at least one of said two clamping locations is moved in the longitudinal direction of said clamped rod for increasing the distance to the other clamping location and by that applying a longitudinal tension load to the rod, and said tension load is measured and the movement of the clamping locations apart is controlled on the basis of information about the tension load measured for adjusting the tension load.

5. A method according to claim 1, wherein it comprises a step of clamping said rod (3), carried out prior to said supporting step, and in which said rod is clamped in two mutually-spaced clamping locations for holding the rod extended between these two clamping locations in said working position, after said cleaving operation has been completed said blade (27) is moved into contact with a waist rod portion (39) resulting from said cleaving for applying a force onto said waist rod portion at the end thereof located at a point for said cleaving, and a releasing of the clamping action in the clamping point of said waist rod portion is co-ordinated with a suction away of that portion promoted by said force applied through the blade on said end of the waist rod portion.

6. A method according to claim 5, wherein the clamping location belonging to the rod portion for later use is after the cleaving operation moved in the direction away from said cleaving point before the blade (27) is moved into contact with said end of the waist rod portion (39).

7. A method according to claim 1, comprising the step of vibrating the blade (27) at a frequency below 750 Hz.

8. A method according to claim 7, wherein the blade (27) is vibrated at a frequency between 100 and 700 Hz.

9. A method according to claim 8, wherein the blade (27) is vibrated at a frequency between 250 and 450 Hz.

10. A method according to claim 1, comprising the step of cleaving rods having a diameter below 600 μm.

11. A method according to claim 10, comprising the step of cleaving rods having a diameter below 300 μm.

12. A method according to claim 11, comprising the step of cleaving rods having a diameter between 50 and 200 μm.

13. A method according to claim 1, comprising the step of cleaving the rods (3) to provide end surfaces within ±0.17° from being exactly perpendicular to a longitudinal axis of the rods (3).

14. A method according to claim 13, wherein the rods (3) are always cleaved to provide end surfaces within ±0.17° from being exactly perpendicular to a longitudinal axis of the rods (3).

15. A method according to claim 1, comprising the step of moving said blade (27) comparatively far in a direction toward said rod (3) in a period of time between two subsequent oscillations at a given velocity of the relatively steady movement when compared with frequency above 1 KHz, thus ensuring cleaving of said rod (3) with minimal strokes and improved optical flatness of a cleaved rod (3).

16. A method according to claim 1, wherein the relatively steady movement of the blade (27) towards the point of lateral contact with the rod is along an arc-like path, and the blade (27) hits the rod (3) in a direction making an angle with the rod (3) differing from 90° for cutting the rod (3) in this direction.

* * * * *